S. C. HOUGHTON.
ROTARY CUTTER-HEAD.

No. 173,122.  Patented Feb. 8, 1876.

WITNESSES
Grenville Peirs
Jno. Kenny

By

INVENTOR
Saml. C. Houghton
Hill & Ellsworth
His Attorneys.

UNITED STATES PATENT OFFICE.

SAMUEL C. HOUGHTON, OF LITTLE FALLS, NEW YORK.

IMPROVEMENT IN ROTARY CUTTER-HEADS.

Specification forming part of Letters Patent No. 173,122, dated February 8, 1876; application filed June 28, 1875.

*To all whom it may concern:*

Be it known that I, SAMUEL C. HOUGHTON, of Little Falls, in the county of Herkimer and State of New York, have invented a new and useful Improvement in Rotary Cutter-Heads; and I do hereby declare the following to be a full, clear, and exact description of the same, reference being had to the accompanying drawings, forming part of this specification, in which—

Figure 1:
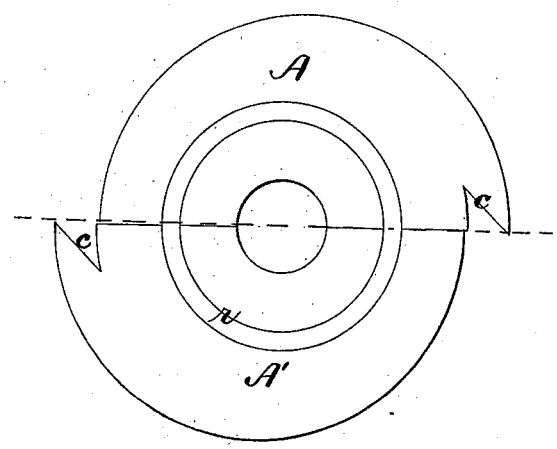
Figure 2:
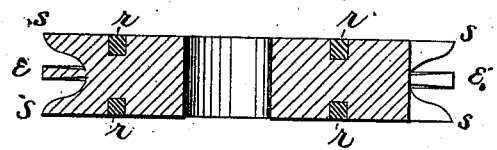

Figure 1 is a side elevation of a cutter-head. Fig. 2 is a transverse section of a cutter-head, and Fig. 3 is a transverse section of a cope-head.

Similar letters of reference in the accompanying drawings denote the same parts.

This invention relates to that class of rotary cutters employed for tonguing, grooving, molding, beading, &c.; and it has for its object, first, to reduce the original cost of constructing such cutter-heads; secondly, to render it easier to keep the cutting-points sharp and their outlines of the proper form; thirdly, to prevent friction of the head against the wood while cutting; fourthly, to diminish vibration; and, generally, to render the whole cutting device more constantly efficient and more durable than heretofore. To these several ends the invention consists in constructing the cutter-head of two semicircular plates, having their straight edges placed together, so that one corner of each plate shall project far enough beyond the periphery of the adjacent plate to form a cutting-point, the two plates being locked firmly in such position by means of embedded rings, and mounted upon a suitable shaft or mandrel, by which they are rotated.

Figure 3:
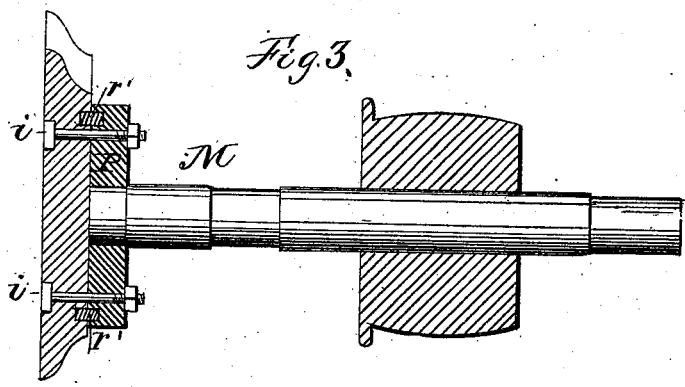

In the drawings the invention is represented as applied to two different kinds of cutters, to wit, in Fig. 2 to a cutter for dressing the edges of stiles, mullions, and rails at one operation, and in Fig. 3 to a cutter or cope head for forming the ends of rails and mullions at two operations, so as to fit them for intersection with the stiles, &c. In either form the cutter-head is constructed by cutting out a circular steel plate, and turning in a lathe or otherwise forming the peripheral edge thereof, so that its cross-section shall be the reverse of that which it is designed to impart to the wood. This plate is then sawed in two, in doing which the saw removes three-sixteenths of an inch, more or less, of the metal. The two parts are then brought together, slipped along so that a corner of each shall project to form a cutting-point, and while in that position are grooved on one or both faces to receive the embedded rings, and bored to fit the shaft or mandrel. The rings are then introduced, the corners undercut to adapt them to operate as cutters, and the head placed upon the shaft, spindle, or mandrel, and secured by collars, or a collar and bolts, in the usual manner. The order of proceeding here indicated may, of course, be varied to suit the convenience of manufacturer.

In the drawings, M is the mandrel, and A A' are the two semicircular segments, locked together by embedded rings $r\ r$. In Fig. 2, the edge is formed with a central cutter, $e$, to cut out the groove for the panel, and two side cutters, $s\ s$, to reduce the corners at each side of the groove to an ogee form. In Fig. 3 the edge is formed to cut out the end of the wood, first on one side of tenon, and then on the other, to fit the molding with which the mullion or rail is to be used. The undercut $c$ enables the cutters to be sharpened at any time by simply grinding the wall of the undercut notch, thereby preserving the contour of the cutting-edge until the cutter is nearly or quite used up. The removal of the metal in sawing the circular plate in two enables the segments to be brought together, so that their outer edges will not rub against the wood after the cut is made. For the purpose of preventing friction of the tongue $e$ against the walls of the groove, which it cuts, it may be turned under or made with dovetail cross-section, as shown in the drawings.

In cope-heads as shown in Fig. 3, a stout collar or circular plate, P, may be secured to the end of the mandrel, and provided either with a projecting annular flange or bead, or an annular bed to receive a ring, $r'$. The cutter-segments may then be fitted onto the annular flange or the ring, and bolted to the collar or plate by means of bolts $i\ i$.

I am aware of the existence and construction of the heads usually called frizzing-heads, and of the head described and shown in Letters Patent of the United States No. 65,954, dated June 18, 1867, and I do not claim either as my invention; but I do claim as new—

The cutter-head constructed of two semicircular segments, A A', locked together by rings $r\ r$, embedded in their faces, said segments having notches $c$ undercut to form projecting cutting-edges at the opposite corners, substantially as described.

SAMUEL C. HOUGHTON.

Witnesses:
  D. B. CHASE,
  B. K. HOUGHTON.